United States Patent
Varadarajan et al.

(10) Patent No.: US 11,869,117 B2
(45) Date of Patent: Jan. 9, 2024

(54) SYSTEMS AND METHODS OF ADAPTIVE, VARIABLE-RATE, HYBRID RAY TRACING

(71) Applicant: Samsung Electronics Co., Ltd., Suwon-si (KR)

(72) Inventors: Keshavan Varadarajan, Austin, TX (US); David C. Tannenbaum, Austin, TX (US)

(73) Assignee: Samsung Electronics Co., Ltd., Yongin-si (KR)

(*) Notice: Subject to any disclaimer, the term of this patent is extended or adjusted under 35 U.S.C. 154(b) by 65 days.

(21) Appl. No.: 17/576,796

(22) Filed: Jan. 14, 2022

(65) Prior Publication Data

US 2022/0301233 A1   Sep. 22, 2022

Related U.S. Application Data

(60) Provisional application No. 63/242,412, filed on Sep. 9, 2021, provisional application No. 63/163,023, filed on Mar. 18, 2021.

(51) Int. Cl.
 *G06T 11/00* (2006.01)
 *G06T 7/40* (2017.01)

(52) U.S. Cl.
 CPC ............ *G06T 11/00* (2013.01); *G06T 7/40* (2013.01)

(58) Field of Classification Search
 CPC ................... G06T 11/00; G06T 7/40
 See application file for complete search history.

(56) References Cited

U.S. PATENT DOCUMENTS

| | | | |
|---|---|---|---|
| 7,439,973 B2 | 10/2008 | Fossum et al. | |
| 8,379,022 B2 | 2/2013 | Tavenrath | |
| 8,836,702 B2 | 9/2014 | Yoon et al. | |
| 9,996,966 B2 | 6/2018 | Lee et al. | |
| 10,909,745 B2 | 2/2021 | Howson et al. | |
| 11,250,611 B1* | 2/2022 | Ruud | G06T 15/80 |
| 2016/0116973 A1 | 4/2016 | Lee et al. | |
| 2019/0172257 A1* | 6/2019 | Nevraev | G06T 15/005 |
| 2019/0311521 A1* | 10/2019 | Nevraev | G06T 15/506 |
| 2020/0051290 A1* | 2/2020 | Yang | G06T 13/20 |
| 2020/0265639 A1 | 8/2020 | Fursund et al. | |
| 2021/0192827 A1* | 6/2021 | Saleh | G06T 1/20 |
| 2021/0327120 A1* | 10/2021 | Brownlee | G06T 15/04 |
| 2021/0390664 A1* | 12/2021 | Pohl | G06T 1/20 |
| 2021/0407183 A1* | 12/2021 | Guo | G09G 5/363 |
| 2022/0245889 A1* | 8/2022 | Fuller | A63F 13/52 |

* cited by examiner

Primary Examiner — Yu Chen
(74) Attorney, Agent, or Firm — Lewis Roca Rothgerber Christie LLP

(57) ABSTRACT

A hybrid ray tracing system includes: a processor; and memory including instructions that, when executed by the processor, cause the processor to: identify a subset of pixels of an image to be ray-traced based on variable rate shading (VRS) screenspace image data; set, based on the VRS screenspace image data, one or more material properties of at least one object corresponding to the subset of pixels; and perform ray-tracing for the subset of pixels to generate a ray-traced image. The ray-tracing includes performing a limited ray casting process based on the set one or more material properties.

18 Claims, 13 Drawing Sheets

SYSTEMS AND METHODS OF ADAPTIVE, VARIABLE-RATE, HYBRID RAY TRACING

CROSS-REFERENCE TO RELATED APPLICATION(S)

This application claims priority to and the benefit of U.S. Provisional Application No. 63/242,412, filed on Sep. 9, 2021, entitled "ADAPTIVE, VARIABLE-RATE, HYBRID RAY TRACING," and also claims priority to and the benefit of U.S. Provisional Application No. 63/163,023, filed on Mar. 18, 2021, entitled "ADAPTIVE, VARIABLE-RATE, HYBRID RAY TRACING," the entire content of all of which is incorporated by reference herein.

BACKGROUND

1. Field

Aspects of one or more embodiments of the present disclosure relate to systems and methods for ray tracing, and more particularly, to systems and methods for adaptive, variable-rate, hybrid ray tracing.

2. Description of Related Art

Ray Tracing is a technique for rendering images inspired by the way light works in nature. Using ray-tracing, the images may be rendered to be more photo-realistic. This is achieved through improved rendering of shadows, specular highlights, reflections, penumbrae (soft shadows), caustics, reflections and transmissions, global illumination (e.g., diffuse inter-reflection phenomena), and/or the like.

While ray-tracing may be used to produce entire rendered images, doing so may generally be too costly and/or time consuming for applications having limited processing resources and/or power constraints, for example, such as for mobile applications, and/or for applications requiring real-time or near real-time rendering, for example, such as video games or other interactive applications.

The above information disclosed in this Background section is for enhancement of understanding of the background of the present disclosure, and therefore, it may contain information that does not constitute prior art.

SUMMARY

One or more embodiments of the present disclosure are directed to hybrid ray tracing.

According to one or more embodiments of the present disclosure a hybrid ray tracing system includes: a processor; and memory including instructions that, when executed by the processor, cause the processor to: identify a subset of pixels of an image to be ray-traced based on variable rate shading (VRS) screenspace image data; set, based on the VRS screenspace image data, one or more material properties of at least one object corresponding to the subset of pixels; and perform ray-tracing for the subset of pixels to generate a ray-traced image. The ray-tracing includes performing a limited ray casting process based on the set one or more material properties.

In an embodiment, the one or more material properties of the at least one object may include a shader attached to the at least one object, and the shader may be selected based on the VRS screenspace image data.

In an embodiment, a relatively more computationally complex shader may be selected when the VRS screenspace image data indicates that the subset of pixels is of relatively higher importance, or a relatively less computationally complex shader may be selected when the VRS screenspace image data indicates that the subset of pixels is of relatively lower importance.

In an embodiment, a relatively lower reflectivity may be set when the VRS screenspace image data indicates that the subset of pixels is of relatively lower importance.

In an embodiment, the one or more material properties of the at least one object may correspond to a number of bounces a ray would perform when it interacted with the object.

In an embodiment, a relatively higher maximum number of bounces may be set when the VRS screenspace image data indicates that the subset of pixels is of relatively higher importance, or a relatively lower maximum number of bounces may be set when the VRS screenspace image data indicates that the subset of pixels is of relatively lower importance.

According to one or more embodiments of the present disclosure, a hybrid ray tracing method includes: identifying a subset of pixels of an image to be ray-traced based on variable rate shading (VRS) screenspace image data; setting, based on the VRS screenspace image data, one or more material properties of at least one object corresponding to the subset of pixels; and performing ray-tracing for the subset of pixels to generate a ray-traced image. The ray-tracing includes performing a limited ray casting process based on the set one or more material properties.

In an embodiment, the one or more material properties of the at least one object may include a shader attached to the at least one object, and the shader may be selected based on the VRS screenspace image data.

In an embodiment, a relatively more computationally complex shader may be selected when the VRS screenspace image data indicates that the subset of pixels is of relatively higher importance, or a relatively less computationally complex shader may be selected when the VRS screenspace image data indicates that the subset of pixels is of relatively lower importance.

In an embodiment, the method may further include setting a relatively lower reflectivity when the VRS screenspace image data indicates that the subset of pixels is of relatively lower importance.

In an embodiment, the one or more material properties of the at least one object may correspond to a number of bounces a ray would perform when it interacted with the object.

In an embodiment, the method may further include setting a relatively higher maximum number of bounces when the VRS screenspace image data indicates that the subset of pixels is of relatively higher importance, or setting a relatively lower maximum number of bounces when the VRS screenspace image data indicates that the subset of pixels is of relatively lower importance.

According to one or more embodiments of the present disclosure, one or more non-transitory computer readable media containing program instructions are provided that, when executed by one or more processors, cause the one or more processors to perform operations including: identifying a subset of pixels of an image to be ray-traced based on variable rate shading (VRS) screenspace image data; setting, based on the VRS screenspace image data, one or more material properties of at least one object corresponding to the subset of pixels; and performing ray-tracing for the subset of pixels to generate a ray-traced image. To perform the ray-tracing, the instructions cause the one or more processors to perform a limited ray casting process based on the set one or more material properties.

In an embodiment, the one or more material properties of the at least one object may include a shader attached to the at least one object, and the instructions may cause the one or more processors to select the shader based on the VRS screenspace image data.

In an embodiment, the instructions may cause the one or more processors to select a relatively more computationally complex shader when the VRS screenspace image data indicates that the subset of pixels is of relatively higher importance, or select a relatively less computationally complex shader when the VRS screenspace image data indicates that the subset of pixels is of relatively lower importance.

In an embodiment, the instructions may cause the one or more processors to set a relatively lower reflectivity when the VRS screenspace image data indicates that the subset of pixels is of relatively lower importance.

In an embodiment, the one or more material properties of the at least one object may correspond to a number of bounces a ray would perform when it interacted with the object.

In an embodiment, the instructions may cause the one or more processors to set a relatively higher maximum number of bounces when the VRS screenspace image data indicates that the subset of pixels is of relatively higher importance, or set a relatively lower maximum number of bounces when the VRS screenspace image data indicates that the subset of pixels is of relatively lower importance.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Figure 1:
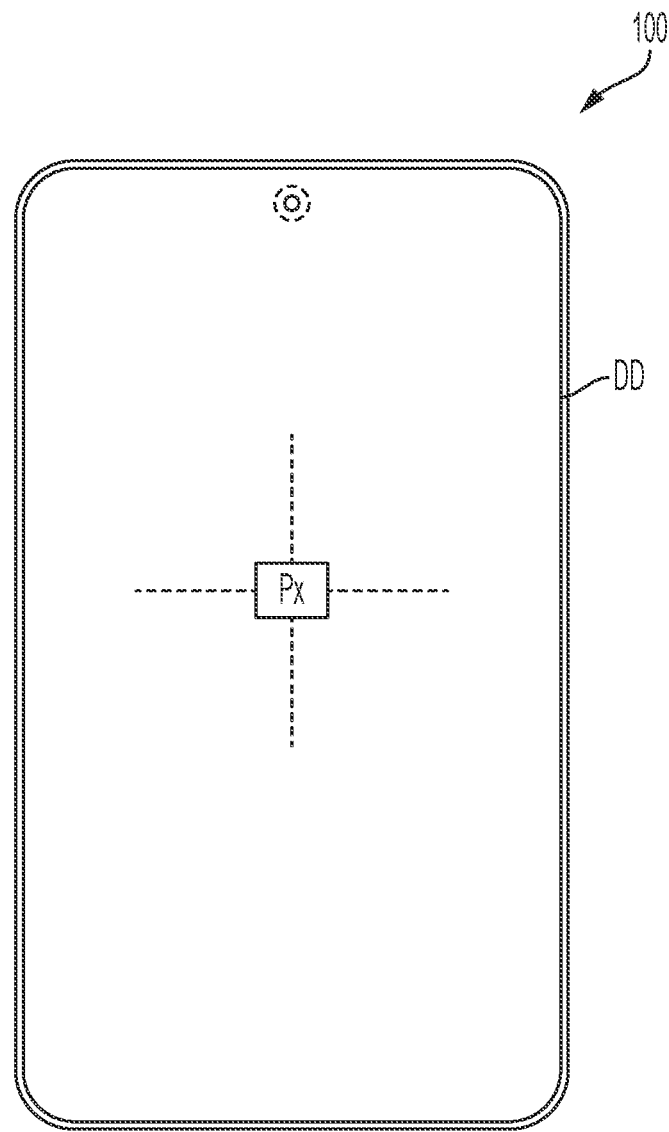
FIG. 1 illustrates an example of a user device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Generally, in a ray-tracing technique, rays may be sent from a view-point (e.g., an eye-point of a user's eyes or a view-point of a camera) through the imaginary screen to all points (e.g., to all pixels) in an image. These rays may be generated from a ray-generation shader by invoking a construct (e.g., a TraceRay construct) that causes a graphics processing unit (GPU) to traverse an acceleration structure to determine if the ray intersects a primitive. Once a primitive intersection is determined, an any-hit shader may be executed. The GPU determines the primitive which is the closest among all primitives that were intersected. The closest primitive's properties effect the shading of the pixel in question. For example, to determine the shading of the pixel in question, an appropriate closest-hit shader may be invoked, based on the material property of the primitive evaluated at the point of intersection, to compute the color, which is then used to modify the shading at the specific pixel.

While pure ray tracing provides for rendering of numerous phenomena (e.g., numerous lighting, shading, reflections, and other effects), it is often at costs that put it out of reach of mobile solutions and the like where power and area expenses may prevent or restrict dedicating sufficient resources to internal ray tracing operations. Also, a subset of optical phenomena may be adequately rendered using raster based techniques. Such raster based techniques may be suitable for modern GPUs, and may allow for the real-time or near real-time rendering desired in any interactive application, for example, such as games and the like.

According to one or more embodiments of the present disclosure, variable rate hybrid ray tracing systems and methods are provided in which rasterization may be performed over an entire image, and various intermediate data may be recorded for use during a subsequent ray-tracing stage. Depending on an object's material properties and variable-rate shading (VRS) controls (note: as used herein, the term VRS data may refer to VRS screenspace image data), a reduced number of ray tracing rays may be generated, and a hybrid composite image may be rendered, such that relevant portions of the image may be rendered by ray-tracing according to the various intermediate data and the remaining portions of the image may be rendered by rasterization. Accordingly, expensive ray tracing resources may be reserved for those objects and those phenomena where raster-based graphics rendering may be unsuitable relative to the quality of a fully ray-traced solution. Further, for those objects deemed worthy of ray tracing, further reduction in cost may be achieved based on application provided hints.

For example, according to one or more embodiments of the present disclosure, image generation may be conceptualized as including two main passes: (1) rasterization; and (2) acceleration structure (e.g., bounding volume hierarchy (BVH)) generation and ray tracing. However, the present disclosure is not limited thereto, and it should be appreciated that post-processing of the generated hybrid composite image may be further performed, for example, in the same or substantially the same fashion as in a purely rasterized or purely ray traced image as would be appreciated by those having ordinary skill in the art.

During the rasterization pass, a ray tracing mask (RTM) may be generated to define a surviving coverage (e.g., pixels/fragments passing the depth &/stencil tests) of objects in a scene that are deemed worthy of ray tracing. As used herein, "surviving coverage" may refer to those pixels that are visible in the final image, but not those pixels that are ultimately obscured by closer (e.g., relative to a view point) opaque objects. Aptness for an object to receive ray tracing may be determined by the material properties of the object. The RTM may be an example of variable rate shading (VRS) data.

Subsequently, while ray tracing the collection of pixels identified for ray tracing refinement (e.g., according to the RTM), a density (e.g., a count) of reflected rays (e.g., secondary rays) generated may be modulated by particular VRS-style parameters in effect for the object and the display screen location of the object. Therefore while a particular object may be identified for ray tracing refinement based on its material properties, it might occupy a position on the display screen that is currently not the focus of attention (e.g., such as far from a foveae region), and therefore, may receive little or no actual ray tracing effort. The resulting image with selectively reduced ray tracing effort may be substantially similar to that of an image having exerted considerable ray tracing effort to refine the objects' pixels, because ultimately, any refinements in these areas may contribute little or may not contribute to the scene's appearance on the display screen.

Unlike in a comparative ray-tracing method in which a ray is sent from the view-point (e.g., the eye-point or the view-point of the camera) through the imaginary screen to all points (e.g., to all pixels) in the image, according to one or more embodiments of the present disclosure, instead of this initial ray casting to all of the pixels, a direct pass through only the identified objects' pixels in the RTM may be performed. Thus, only the identified pixels in the RTM may generate reflection (or transmission) rays (e.g., secondary rays), and the number of secondary rays generated may be further limited by the particular VRS-style parameters in effect for the identified objects' pixels in the RTM. In other words, according to one or more embodiments of the present disclosure, the rasterization pass may be analogous to the initial ray casting as in the comparative method, and instead of the rays being sent for all of the pixels in the image, only the identified pixels for ray-tracing refinement in the RTM may be sent rays. Note that reflectivity may be determined based on an altered reflectivity metric (e.g., a coefficient that is multiplied to a number determined as part of a reflectivity-determining process) for an amount of reflection, as an overall amount of bounces, a ray would experience when it interacts with the object. For example, a relatively higher altered reflectivity metric may cause a relatively higher number of bounces to be determined, whereas a relatively lower altered reflectivity metric may cause a relatively lower number of bounces to be determined.

Additionally, any suitable rasterization technique may be used for the majority of the lighting/shading of an object's pixels, and ray tracing may be reserved for specialized effects, for example, such as transmission with diffraction or specular reflections that may not be suitably achieved with screen-space methods. In some embodiments, a combination of screen-space based specular reflections augmented by ray traced reflections may be performed to provide a more complete and compelling visual result, while still reducing the ray tracing computation budget.

According to one or more embodiments, in addition to adjusting secondary ray counts responsive to the VRS-style parameters, the actual material shaders invoked may be modulated. For example, an application may provide multiple versions of a material shader, and a suitable material shader may be selected therefrom at run-time based on an actual shading rate in effect. Thus, an appropriate selection of ray generation reduction and shader complexity reduction may be provided depending on a performance limiter (e.g., ray/BVH intersections or material shader calculations).

Accordingly, in one or more embodiments of the present disclosure, the amount of ray-tracing effort expended on a given image may be tuned based on an amount of ray tracing support available. In some embodiments, ray-tracing may be used incrementally, for example, such that an object may be rendered provisionally via a suitable rasterization technique and then, frame-time permitting, may receive additional refinement via ray-tracing. In some embodiments, de-noising operations may be limited to just areas that were generated via ray tracing, and possibly to just certain subsets of the ray traced objects. For example, a carpet or other cloth may actually look better without de-noising.

In some embodiments, ray traced objects may have access to the entire acceleration structure (e.g., the BVH), and thus, may "see" all other geometry in the scene, while non-ray-traced objects may have zero or negligible acceleration structure access overhead. In some embodiments, other objects identified to be unimportant for the subset of ray traced objects may be omitted altogether from the acceleration structure generation, or may otherwise be labeled as having limited participation in the ray tracing operation.

In some embodiments, ray tracing may be applied for complex emissive objects, for example, such as a helix for an incandescent lightbulb filament or to the cylindrical shape of a lightsaber (e.g., more general geometries than points or planes). In some embodiments, multiple versions of complex material shaders may be provided to allow for reduced material shader computation effort when ray/BVH intersections are not the limiting factor.

FIG. 1 illustrates an example of a user device 100 according to one or more embodiments of the present disclosure.

Referring to FIG. 1, the user device 100 may be any suitable electronic device including or connected to a display device DD to display images (e.g., still images, moving images, and/or the like). The user device 100 may include a plurality of pixels PX that are driven to emit light to display an image on the display device DD. For example, each of the pixels PX may be driven according to a data signal. The data signal may be generated based on image data (e.g., grayscale data) received, for example, from a graphics processing unit (GPU).

While FIG. 1 shows a smart phone as an example of the user device 100, the present disclosure is not limited thereto. For example, the user device 100 may include (e.g., may be) any suitable electronic device including or connected to a display device, for example, such as a mobile phone, a smart phone, a tablet computer, a television (TV), a digital TV, a 3D TV, a room mirror, an automobile mirror, a wearable electronic device, a personal computer (PC), a home appliance, a laptop computer, a personal digital assistant (PDA), a portable multimedia player (PMP), a digital camera, a music player, a portable game console, a navigation device, and/or the like.

Figure 2:
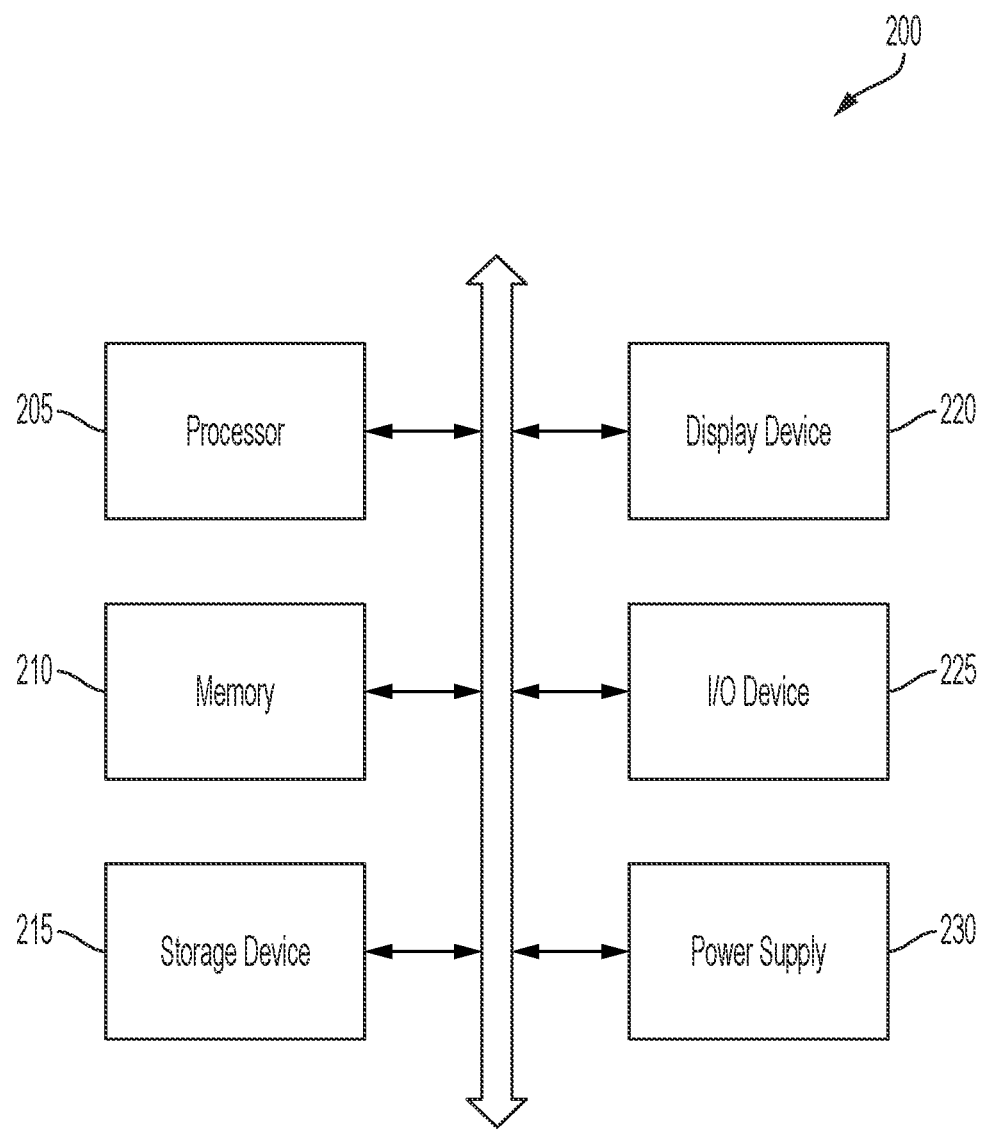
FIG. 2 illustrates a block diagram of an electronic device according to one or more embodiments of the present disclosure.

FIG. 2 illustrates a block diagram of an electronic device 200 according to one or more embodiments of the present disclosure. In some embodiments, the user device 100 may be an example of the electronic device 200, but the present disclosure is not limited thereto.

The electronic device 200 may include a processor 205, memory (e.g., a memory device) 210, a storage device 215, a display device 220, an input/output (I/O) device 225, and a power supply 230. The electronic device 200 may further include a plurality of ports for communicating with a video card, a sound card, a memory card, a universal serial bus (USB) device, other suitable electronic devices, and/or the like.

The processor 205 may perform various computing functions or tasks. The processor 205 may be an application processor (AP), a microprocessor, a central processing unit (CPU), and/or the like. The processor 205 may be connected to other components via an address bus, a control bus, a data bus, and/or the like. Further, in some example embodiments, the processor 205 may be further connected to an extended bus, for example, such as a peripheral component interconnection (PCI) bus. In some embodiments, the processor 205 may include a GPU to provide image data (e.g., grayscale data or grayscale values) to the display device 220, but the present disclosure is not limited thereto, and in other embodiments, the display device 220 may be communicably connected to an external GPU to receive the image data.

The memory 210 may store data for operations of the electronic device 200. For example, the memory 210 may include at least one non-volatile memory device, for example, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like, and/or at least one volatile memory device, for example, such as a dynamic random access memory (DRAM) device, a static random access memory (SRAM) device, a mobile dynamic random access memory (mobile DRAM) device, and/or the like.

The display device 220 may be an organic light-emitting display device, a inorganic light-emitting display device, a liquid crystal display (LCD) device, and/or the like. The display device 220 may receive the image data, for example, from the GPU, and may generate data signals to drive the plurality of pixels PX to emit light according to the image data. Accordingly, an image may be displayed on the display device 220 by driving the plurality of pixels PX of the display device 220 according to the image data received from the GPU.

The storage device 215 may be a solid state drive (SSD) device, a hard disk drive (HDD) device, a CD-ROM device, and/or the like. The I/O device 225 may be an input device, for example, such as a keyboard, a keypad, a mouse, a touch screen, and/or the like, and an output device, for example, such as a printer, a speaker, and/or the like. The power supply 230 may supply power for operations of the electronic device 200. The display device 220 may be connected to the other components through the buses or other suitable wired or wireless communication links.

Figure 3:
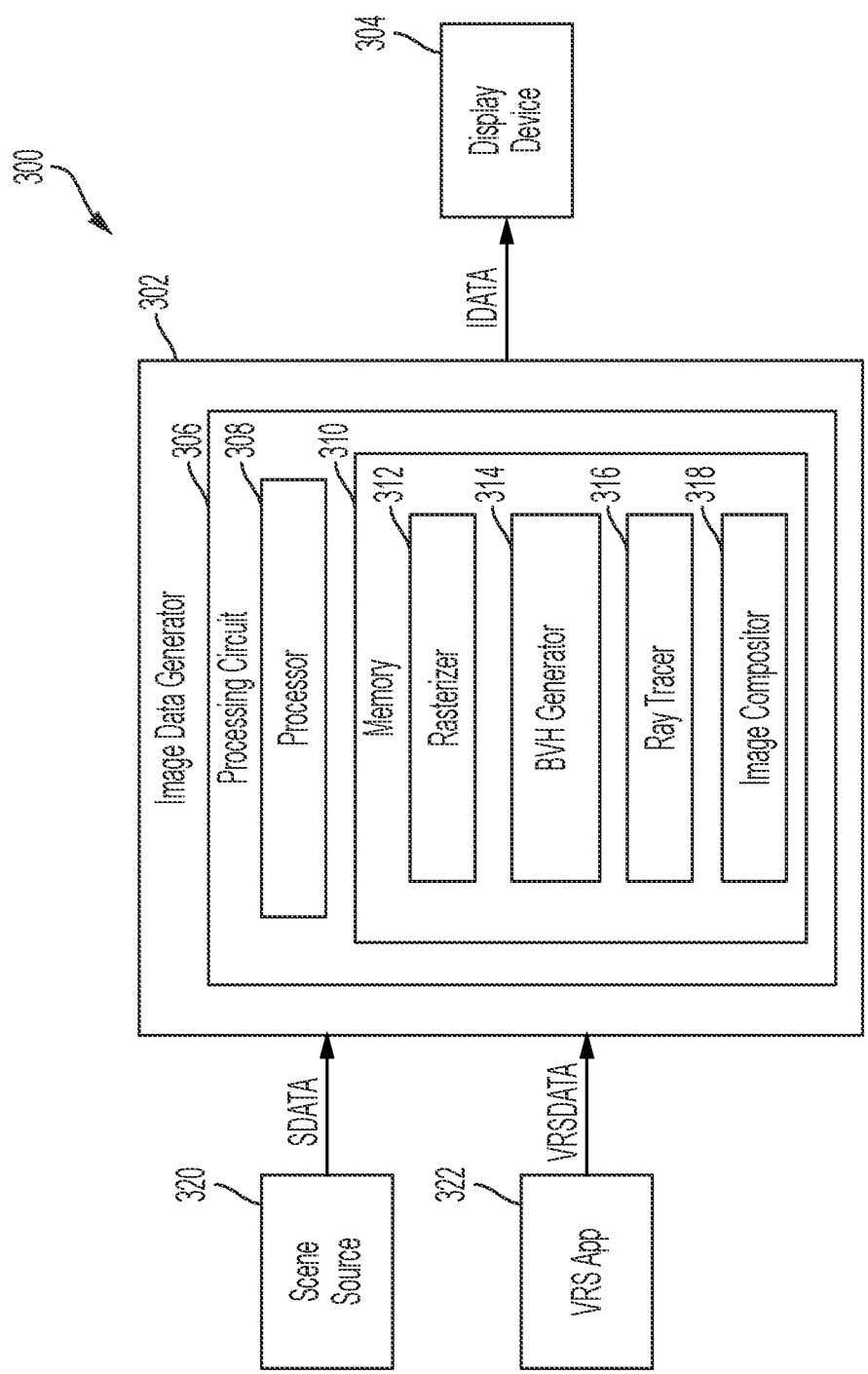
FIG. 3 illustrates a variable rate hybrid ray tracing system according to one or more embodiments of the present disclosure.
Figure 4:
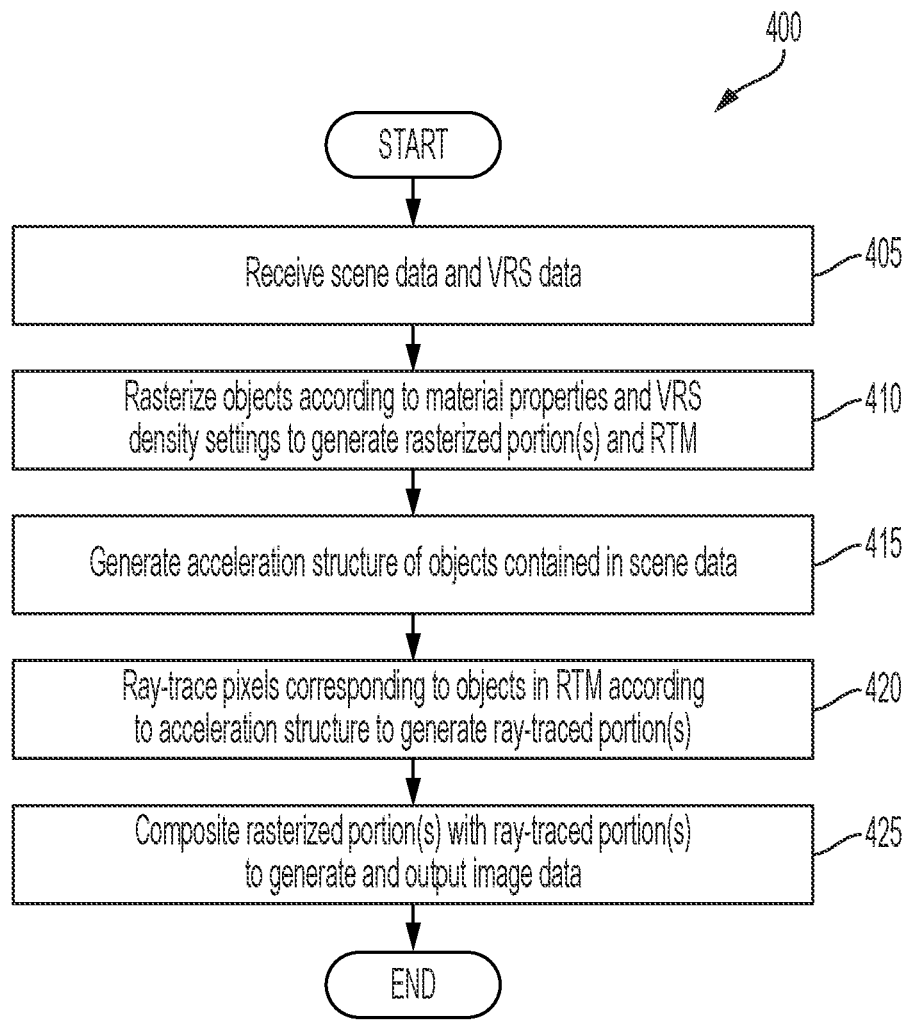
FIG. 4 illustrates a variable rate hybrid ray tracing method according to one or more embodiments of the present disclosure.

FIG. 3 illustrates a variable rate hybrid ray tracing system 300 according to one or more embodiments of the present disclosure. FIG. 4 illustrates a variable rate hybrid ray tracing method 400 according to one or more embodiments of the present disclosure. However, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations.

First, referring to FIG. 3, the variable rate hybrid ray tracing system 300 may include an image data generator 302 and a display device 304. As a non-limiting example, the image data generator 302 may include (e.g., may be) a GPU, and the display device 304 may include (e.g., may be) the display device DD and/or 220 shown in FIGS. 1 and 2. Accordingly, the image data generator 302 may be implemented as part of the processor 205 and memory 210 or as a separate processor and memory implemented on the user device 100 and/or the electronic device 200 shown in FIGS. 1 and 2, or may be an external processor (e.g., an external GPU) with respect to the user device 100 and the electronic device 200 shown in FIGS. 1 and 2.

In more detail, the image data generator 302 may include a processing circuit 306 having a processor 308 and memory 310. In various embodiments, the processor 308 may include a general-purpose processor, an Application Specific Integrated Circuit (ASIC), one or more Field Programmable Gate Arrays (FPGAs), a Digital Signal Processor (DSP), any other suitable electronic processing components, or combinations thereof. The memory 310 may include tangible, non-transient, volatile memory or non-volatile memory, for example, such as Random Access Memory (RAM), Read-Only Memory (ROM), Non-volatile RAM (NVRAM), Flash Memory, hard disk storage, any other suitable electronic storage medium, or combinations thereof. The memory 310 stores instructions (e.g., data, computer code, and/or programming logic) that, when executed by the processor 308, controls the operations of the user device 202. Accordingly, the memory 310 includes database components, object code components, script components, and/or any other type of information structure for supporting the various activities and information structures described herein.

In some embodiments, the memory 310 may include a rasterizer 312, an acceleration structure (e.g., a Bounding Volume Hierarchy (BVH)) generator 314, a ray tracer 316, and an image compositor 318. In brief overview, the rasterizer 312 may rasterize scene data SDATA to generate a rasterized image corresponding to the scene data SDATA, and may further generate a ray-tracing mask (RTM) identifying portions (e.g., pixels) of the image that may be suitable for further ray-tracing refinement. The acceleration structure (BVH) generator 314 may generate an acceleration structure (e.g., a Bounding Volume Hierarchy (BVH)) defining the primitives of the scene data SDATA, which allows searching the space for primitives that intersect a ray in sub-linear (logarithmic) time. The ray tracer 316 may use the acceleration structure (BVH) to ray-trace the identified pixels in the RTM using any suitable ray-tracing and/or recursive ray-tracing method to generate a ray-traced portion of the image. The image compositor 318 may combine the rasterized portions (e.g., rasterized pixels) of the image with the ray-traced portion (e.g., the ray-traced pixels) to generate a hybrid composite image, and may output image data corresponding to the hybrid composite image defining the grayscale values for the pixels in the display device to suitably display the hybrid composite image.

For example, in more detail, referring to FIGS. 3 and 4, the method 400 may start, and scene data SDATA and variable rate shading (VRS) data VRSDATA may be received at block 405. For example, the image data generator 302 may receive the scene data SDATA from a scene source (e.g., an image source, a video source, a game source, a sensor, a camera, and/or the like), and may receive the VRS data VRSDATA from a VRS application 322. The VRS data VRSDATA may include VRS settings and parameter information defining a shading rate for the pixels contained in a given area of the image on a display screen, such that a group of pixels at one area of the image on the display screen may have a different shading rate than that of a group of pixels at another area of the image on the display screen.

The pixels of the objects contained in the scene data SDATA may be rasterized according to material properties of the objects and VRS density settings to generate rasterized portion(s) (e.g., rasterized pixels) of the image and the RTM at block 410. For example, at block 410, any and all suitable functionality that can be achieved using rasterization as would be known to those skilled in the art may be performed by the rasterizer 312, for example, such as via using light maps to provide for simple mirror effects, or cube-maps or other suitable means of simulating some form of light tracing using relatively few additional rasterization passes (e.g., light probes).

As part of the rasterization pass, objects that are to be ray traced may be identified, and a pixel-level RTM may be generated. This may be accomplished using either a render target resource, or a suitable hardware structure that is dedicated to fast ray tracing post-rasterization processing. For example, in some embodiments, the RTM may be implemented as a buffer. In some embodiments, the RTM may be traversable in time O(n) (where n==number of set pixels). In other words, the RTM may be generated so that it may not be necessary to scan through the entire buffer to identify the pixels set for ray tracing refinement. Additionally, in some embodiments, during processing, the pixels identified in the RTM may be sent in parallel to the shader cores to maintain or substantially maintain optimal occupancy.

For example, during rasterization, for each pixel rasterized, the rasterizer 312 may write a count to the RTM (e.g., with the buffer initialized to all zeros). In this case, each pixel may be represented by a bit in the buffer having an initial value of 0, and when the rasterizer 312 determines, based on the material properties, that a pixel is suitable for further ray-tracing refinement during rasterization of the pixel, the rasterizer 312 may set the corresponding bit for the pixel to 1. Thus, the count may indicate the relative importance of ray tracing at a given pixel, and may be determined based on a material property indicating that ray tracing may be desired, and in some embodiments, may also be determined by the VRS spatial density setting in effect for the given pixel. The VRS density settings may provide information to vary the effort expended on ray tracing at the given pixel, such that ray tracing may be concentrated on and/or reserved for objects deemed important by the application. For example, even if a material property of a pixel indicates that the pixel may be suitable for further ray-tracing refinement, if the pixel is located in an area of a display screen having a low granularity shading rate (e.g., as determined by the VRS spatial density settings), the rasterizer 312 may forego identifying the pixel in the count of the RTM (e.g., the rasterizer 312 may not set the count for the pixel in the RTM buffer, such that the pixel is not identified for further ray-tracing refinement).

Accordingly, as a result of block 410, the RTM may be generated for just those pixels identified for further refinement via ray tracing (e.g., based on their material properties and/or VRS density settings). Typically these may be for objects that are transparent or translucent, or in situations where there is a specific need for some effect that cannot be performed using a screen-space approach (for example where there is specular reflection of geometry that is arbitrarily far beyond the screen space, or in other words, screen-space reflection is not a sufficient solution). Ray tracing need not be limited to adding to the light value of a pixel, but may also contribute to improved shadow effects.

An acceleration structure (BVH) of the objects contained in the scene data SDATA may be generated at block 415. For example, in some embodiments, the acceleration structure generator 314 may generate the acceleration structure (BVH) in parallel with (e.g., concurrently or simultaneously with) the rasterization pass of block 410. It is noted that, although potentially only a small subset of the total objects in the scene data SDATA may be identified to receive ray tracing enhancements, all objects (or some application chosen subset) may be placed in the acceleration structure (BVH). This may allow for all scene objects to potentially contribute to the ray traced results applied to those few objects that actually shoot secondary rays. As an example, consider a scene with numerous opaque objects and a collection of a few translucent objects such as wine glasses. In this case, the wine glasses may be identified for ray-tracing refinement (e.g., during rasterization), whereas all other opaque objects may be slated for rasterization-based rendering. However, the wine glasses may still need to have information for all the other scene objects, such that the wine glasses may properly incorporate this information as part of either transmitted/reflected/refracted rays.

In some embodiments, as discussed in more detail below with reference to FIGS. 6 and 7, the BVH generator 314 may use the VRS data VRSDATA to modulate a number of secondary rays generated by an object identified in the RTM, such that secondary ray processing resources may be reduced.

The pixels corresponding to the objects in the RTM may be ray-traced according to the acceleration structure (BVH) to generate ray-traced portion(s) (e.g., ray-traced pixels) at block 420. For example, the ray tracer 316 may ray-trace the pixels identified in the RTM using any suitable ray-tracing method as would be understood by those having ordinary skill in the art. Some non-limiting examples of ray-tracing methods are described in more detail below with reference to FIGS. 9 and 10.

The pixels identified in the per-pixel RTM may be processed in any suitable order, because the calculations may be independent. However, for efficiency reasons (e.g., memory subsystem efficiency and/or shader branch divergency efficiency), in some embodiments, an order in which adjacent pixels are processed concurrently (e.g., simultaneously) or in a direct sequence may be desired. In some embodiments a dedicated hardware apparatus may be used to efficiency dispatch maximally occupied warps based on the contents of the RTM.

The rasterized portions (e.g., the rasterized pixels) and the ray-traced portions (e.g., the ray-traced pixels) may be composited (e.g., combined) to generate a hybrid composite image, and image data corresponding to the hybrid composite image may be output at block 425. For example, the image compositor 318 may combine the rasterized pixels with the ray-traced pixels to generate the hybrid composite image using any suitable method known to those skilled in the art, and may generate and output image data corresponding to the hybrid composite image to a display device to display the hybrid composite image. In some embodiments, the compositing may be performed incrementally, for example, in which at any moment the value for a pixel is either the completed rasterized value, or is the rasterized value plus some delta value due to ray tracing. Thus, if a process is interrupted for some reason, for example, as when a higher-priority task needs the GPU, there may already be a reasonable initial pixel value available (e.g., the rasterized pixel value).

Additionally, various image-processing techniques may employ the RTM to allow for smooth transitions from ray traced to raster-generated imagery, thereby avoiding any harsh, undesirable/unaesthetic boundaries or halos. Further, any suitable post-processing techniques may be applied to the hybrid composite image (e.g., after the compositing block 425) to apply various suitable effects (e.g., motion blur, depth of field, and the like) using any suitable image post-processing method as would be understood by those skilled in the art.

Figure 5:
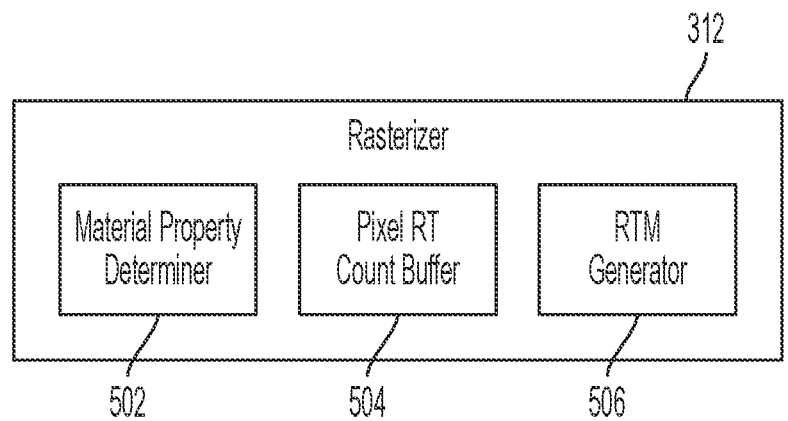
FIG. 5 illustrates a block diagram of a rasterizer according to one or more embodiments of the present disclosure.

FIG. 5 illustrates a block diagram of a rasterizer 312 according to one or more embodiments of the present disclosure.

Referring to FIGS. 3 and 5, the rasterizer 312 may rasterize the scene data SDATA to generate a rasterized image of the scene data SDATA. For example, the rasterizer 312 may rasterize the scene data SDATA to generate rasterized information (e.g., rasterized color information) for each pixel of a corresponding rasterized image generated by rasterizing the scene data SDATA. Thus, any and all suitable effects that can be achieved using rasterization as would be known to those skilled in the art may be performed by the rasterizer 312 on the scene data SDATA to generate the rasterized image and the corresponding rasterized information for each pixel in the rasterized image.

During the rasterization pass, the rasterizer 312 may further generate the pixel-level RTM. For example, the rasterizer 312 may include a material property determiner 502, a pixel RT count buffer 504, and an RTM generator 506. In some embodiments, when the rasterizer 312 rasterizes a corresponding pixel to generate the corresponding rasterized image, the material property determiner 502 may determine a material property of the corresponding pixel (e.g., a material property of a portion of an object in the scene data SDATA represented by the corresponding pixel). If the material property of the corresponding pixel indicates that the corresponding pixel is suitable for further ray-tracing refinement, the rasterizer 312 may write a count in the pixel RT count buffer 504 for the corresponding pixel. In some embodiments, the rasterizer 312 may further use the VRS data VRSDATA to determine a current shading rate in effect for the corresponding pixel. In this case, if the shading rate for the corresponding pixel is below a threshold shading rate (e.g., indicating that the pixel is located at an area of the display screen needing less shading effort), then the rasterizer 312 may not include the corresponding pixel in the pixel RT count buffer 504 irrespective of its material properties.

Thus, each of the pixels having a count value in the pixel RT count buffer 504 may be a rasterized pixel that has been identified for further ray-tracing refinement, and may be additionally associated with the corresponding rasterized information (e.g., the rasterized color information). The RTM generator 506 may generate the RTM according to the pixel RT count buffer 504 to generate a mask including only those pixels identified in the pixel RT count buffer 504 for further ray-tracing refinement. The RTM may be used by the ray tracer 316 to ray trace the pixels identified in the RTM as described in more detail below with reference to FIGS. 8-10.

Figure 6:
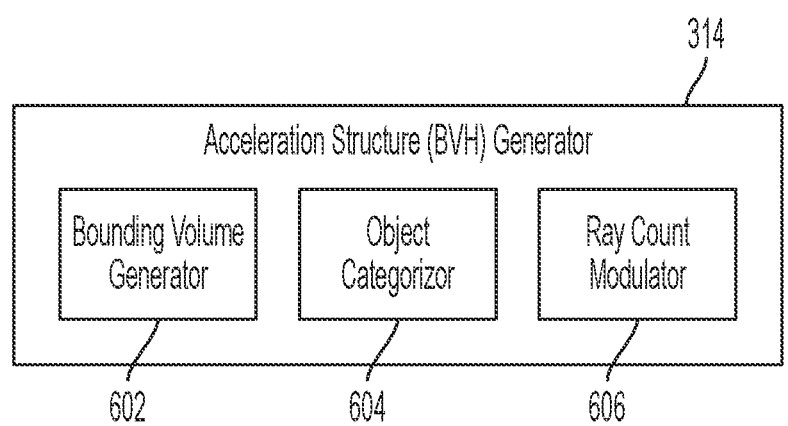
FIG. 6 illustrates a block diagram of an acceleration structure generator according to one or more embodiments of the present disclosure.

FIG. 6 illustrates a block diagram of an acceleration structure generator according to one or more embodiments of the present disclosure. FIG. 7 illustrates an example of an acceleration structure according to one or more embodiments of the present disclosure.

Referring to FIGS. 3 and 6, in some embodiments, the acceleration structure (BVH) generator 314 may generate an acceleration structure including a data structure containing primitives, for example, such as a Bounding Volume Hierarchy (BVH), which allows for efficient searching of the space for primitives that intersect a ray in sub-linear (e.g., logarithmic) time. For example, in some embodiments, the acceleration structure (BVH) generator 314 may include a bounding volume generator 602, an object categorizer 604, and a ray count modulator 606.

The bounding volume generator 602 may generate the acceleration structure (e.g., the BVH). For example, the acceleration structure (BVH) may be a tree structure defining a set of geometric objects contained in the scene data SDATA, which may be wrapped in bounding volumes that form the leaf nodes of the tree structure, which, in turn, are grouped within larger bounding volumes in a recursive fashion. Thus, when evaluating an object contained in a leaf node for ray-tracing refinement, children bounding volumes may not be evaluated if their parent bounding volumes are not intersected by a ray. According to one or more embodiments of the present disclosure, when ray-tracing the pixels identified in the RTM, the ray-tracer 316 may use the acceleration structure (BVH) to determine the intersection of rays and the objects contained in the RTM, to determine a final ray-traced shading value (e.g., a final ray-traced color/luminance value) of each of the pixels identified in the RTM.

In some embodiments, the acceleration structure may be extended to include "importance" information gleaned from the VRS data VRSDATA. For example, certain areas of the geometry of an object may be more/less important with respect to the number of rays sent according to a location of the corresponding pixels of the object on the display screen and a shading rate of the corresponding pixels. Additionally, parts of the acceleration structure may be assigned an "ambient" background color to return, regardless of any further ray/object intersecting testing. Objects deemed of low importance, as indicated by this augmented acceleration structure data, may become fuzzy in terms of reflections, but will consume considerably less calculations during traversal. This can be further refined (e.g., given a finer level of granularity) to limit the levels of acceleration structure traversal based on VRS directives or the precision of a ray/object intersection calculation, all in the name of saving energy and performance, when an application has directed that some aspect is of lesser importance, and thus, simplifications are acceptable. In many scenarios, either some of, or all of, an acceleration structure may remain invariant from frame to frame, and thus, the additional work expended while constructing the acceleration structure may be greatly amortized by the improved pixel-per-area (PPA) realized at ray tracing (e.g., BVH traversal/query) time.

For example, in some embodiments, the object categorizer 604 may determine from the VRS data VRSDATA whether or not the evaluated pixels of an object are located at an area of the display screen considered to be an important area for further ray-tracing refinement based on the shading rate in effect for the area. For example, if the VRS data VRSDATA indicates that an area of the display screen at which the evaluated pixels of the object are located is far from the foveae region, and thus, has a lower granularity shading rate, the object categorizer 604 may categorize the pixels of the evaluated object as having a lower importance for ray-tracing, and thus, ray-tracing in these areas may be performed or may be limited according to the resources available for ray-tracing at any given time.

The ray count modulator 606 may temper the number of secondary rays spawned from an intersection point of a ray and an object defined in the BVH based on the VRS data VRSDATA. For example, based on the shading rate for an evaluated pixel of the object on the display screen, the ray count modulator 606 may modify the number of secondary rays generated by an intersection point of a ray and the evaluated pixel to limit the level of traversals of the acceleration structure during ray tracing.

Figure 7:
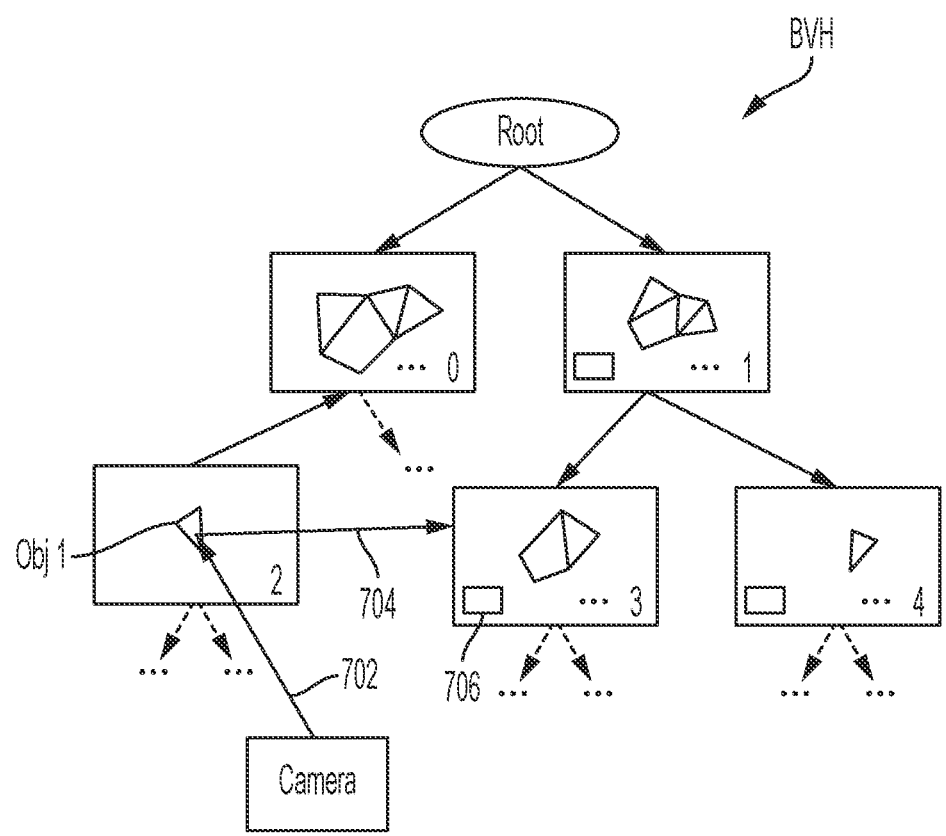
FIG. 7 illustrates an example of an acceleration structure according to one or more embodiments of the present disclosure.

For example, referring to FIGS. 6 and 7, a primary ray 702 may be shot (e.g., from a ray generation shader) from a view-point (e.g., a view-point of a camera), and may be incident on a first object Obj1 in box 2. As part of coloring the first object Obj1 in box 2, a secondary ray (e.g., a reflected ray) 704 may be shot from an intersection point of the primary ray 702 and the first object Obj1, and may be determined to intersect box 3. Generally, the ray tracing process may require that for each ray, a complete traversal of the acceleration structure is performed to find the closest intersection. However, this may be an expensive operation, because for each closest intersection, a given reflection ray may spawn multiple secondary, tertiary, and the like rays, depending on the surface material characteristics of the object.

According to one or more embodiments of the present disclosure, however, the number of secondary rays spawned by any ray intersection point may be controlled, for example, according to the shading rate (e.g., the VRS data VRSDATA) in effect for the evaluated pixels. For example, the ray count modulator 606 may generate traversal control data 706 according to the VRS data VRSDATA to instruct that the traversal proceed down the acceleration structure no more than n additional levels according to the shading rate in effect for the corresponding area, where n may be a natural number that may be as small as zero, implying that no additional traversals are to be performed. In other words, the ray count modulator 606 may use the VRS data VRSDATA to determine the shading rate in effect for an area of the display screen, and may generate the traversal control data 706 for the area based on the shading rate to limit the number of secondary rays generated by intersection points of objects located in the area of the display screen.

Returning to the example shown in FIG. 7, the pixels corresponding to box 2 may be located at an area of the display screen having a first shading rate, and the pixels corresponding to box 3 may be located at an area of the display screen having a second shading rate lower than the first shading rate. In this case, in some embodiments, the ray count modulator 606 may compare the shading rate of each of box 2 and box 3 with one or more threshold shading rates, and may determine the number of secondary rays that may be generated from each of box 2 and box 3 according to the comparison. For example, the ray count modulator 606 may determine that the number of secondary rays generated by the pixels of box 2 may be greater than the number of secondary rays generated by the pixels of box 3 based on the different shading rates of boxes 2 and 3. In some embodiments, the ray tracer 316 may use the traversal control data 706 of the acceleration structure BVH to reduce the number of secondary rays that may be evaluated to determine the final color/luminance of a ray-traced pixel.

Figure 8:
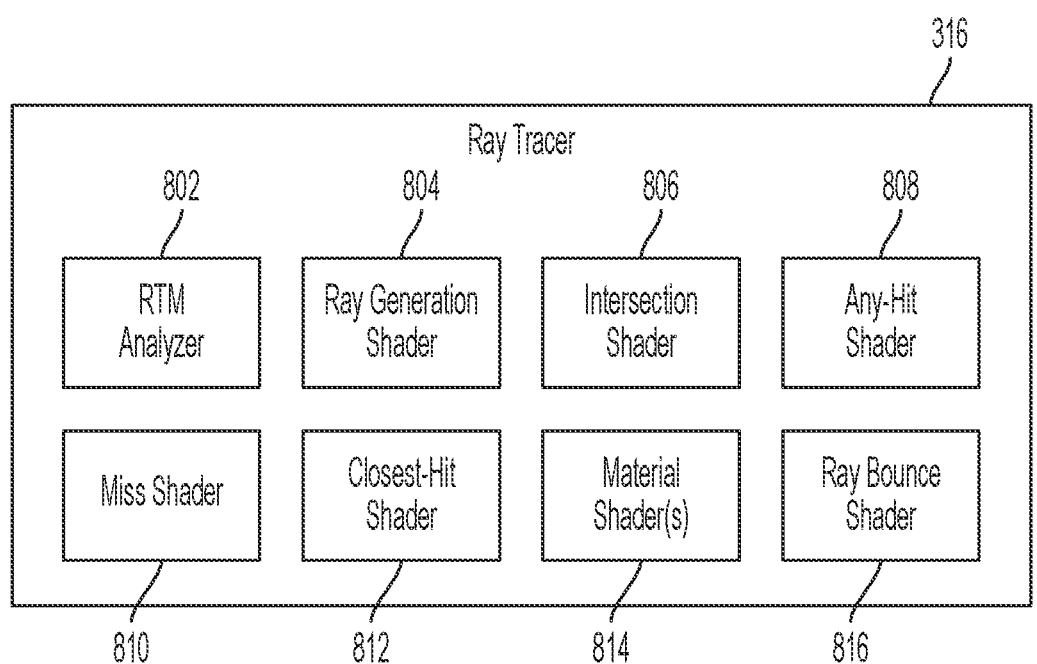
FIG. 8 illustrates a block diagram of a ray tracer according to one or more embodiments of the present disclosure.
Figure 9:
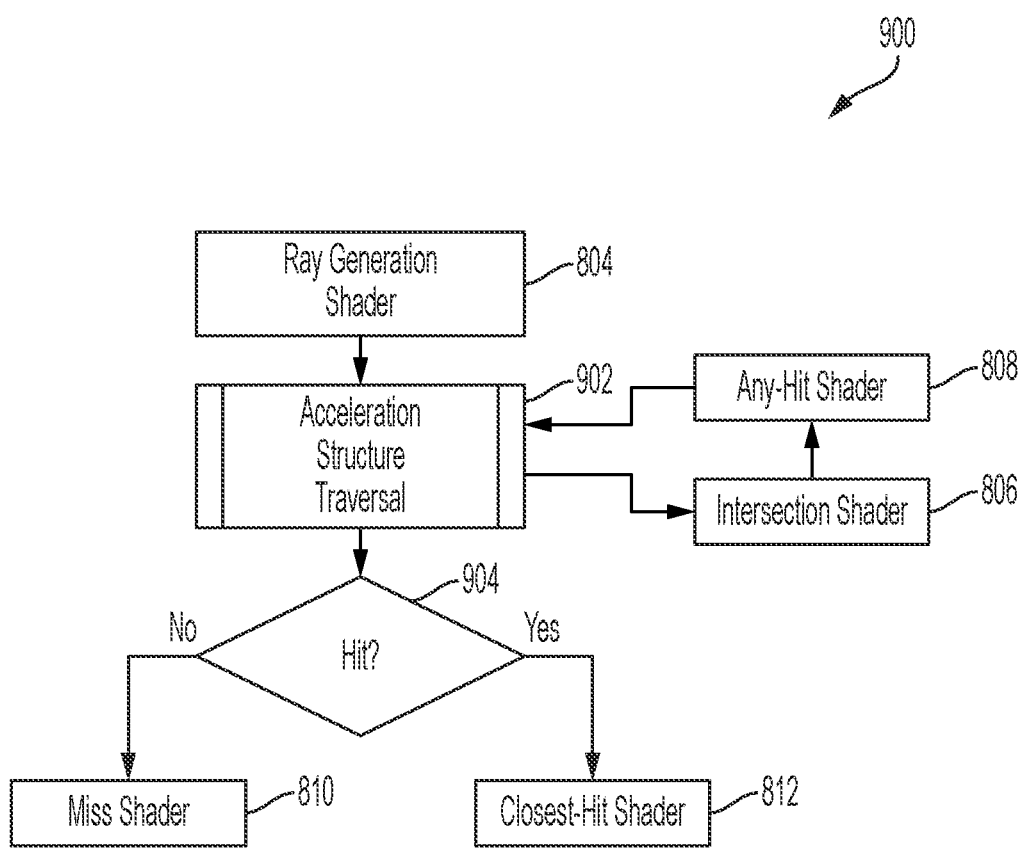
FIG. 9 illustrates an example of a ray-tracing method according to one or more embodiments of the present disclosure.
Figure 10:
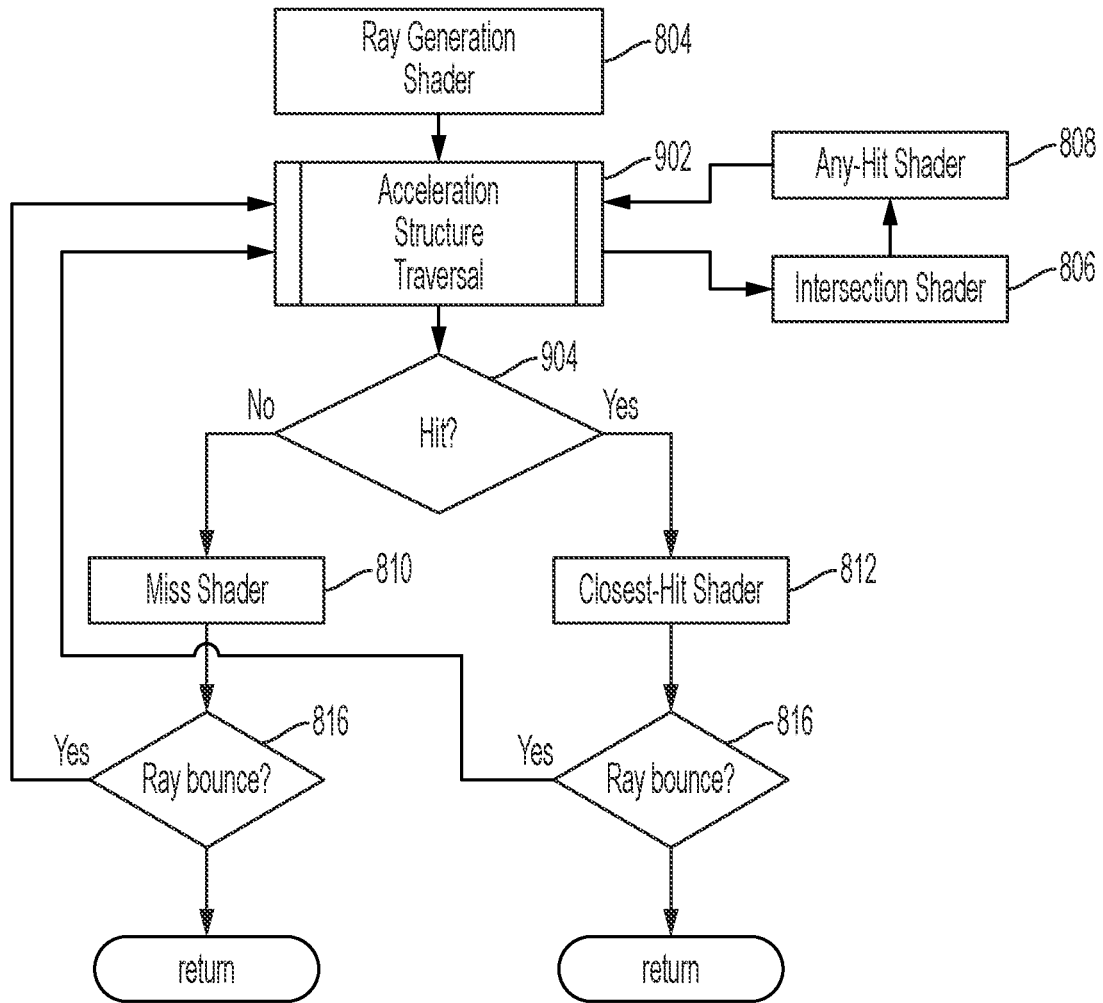
FIG. 10 illustrates an example of a recursive ray-tracing method according to one or more embodiments of the present disclosure.

FIG. 8 illustrates a block diagram of a ray tracer according to one or more embodiments of the present disclosure. FIG. 9 illustrates an example of a ray-tracing method according to one or more embodiments of the present disclosure. FIG. 10 illustrates an example of a recursive ray-tracing method according to one or more embodiments of the present disclosure.

Referring to FIGS. 3 and 8, in some embodiments, the ray tracer 316 may ray-trace the rasterized pixels identified in the RTM. For example, in some embodiments, as described above, the RTM may include the buffer count of the pixels in the rasterized image identified for ray-tracing refinement, and the ray tracer 316 may ray-trace the pixels identified in the RTM using any suitable ray tracing method. In some embodiments, the ray tracer 316 may use the acceleration structure (BVH) to identify a shading (e.g., a color/luminance) of an evaluated pixel, and the number of secondary rays that are generated may be reduced, for example, by the traversal control data 706. Accordingly, processing of the secondary rays may be reduced, and the overall ray-tracing effort may be reduced. For example, in some embodiments, the ray tracer 316 may include an RTM analyzer 802, a ray generation shader 804, an intersection shader 806, an any-hit shader 808, a miss shader 810, a closest-hit shader 812, a plurality of different versioned material shader(s) 814, and a ray bounce shader 816.

In brief overview, the RTM analyzer 802 may determine portions (e.g., the pixels) of the rasterized image that has been identified for ray-tracing refinement according to the RTM, and the ray generation shader 804 may shoot rays from a view-point (e.g., an eye-point or a view-point of a camera) towards the relevant portions (e.g., the relevant pixels) of the scene identified by the RTM. The intersection shader 806, the any-hit shader 808, the miss shader 810, the closest-hit shader 812, the material shader(s) 814, and the ray bounce shader 816 may be invoked to determine a final color/luminance value of the pixel being evaluated.

For example, referring to FIGS. 3, 8, and 9 a ray-tracing method 900 may start, and a ray generation shader 804 may be launched. The ray generation shader 804 may be launched on a set of rays whose ray origins are spatially proximate with each other, by grouping them together as a warp (or a wavefront). For example, the ray generation shader 804 may be launched on a group of nearby non-zero values in the RTM. The ray generation shader 804 invokes a suitable acceleration structure traversal method (or apparatus) 902, for example, such as ray/BVH intersection testing. For example, during the course of the acceleration structure traversal, each of the rays may intersect different primitives.

When the first primitives intersected by each of these rays have been determined by an intersection shader 806, an any-hit shader 808 may be executed, if needed or desired, on all of these rays. The any-hit shader 808 executed for all of these rays may be the same or may be different depending on the primitive. For example, the any-hit shader 808 may be invoked on the functional stack of the ray generation shader 804. The any-hit shader 808 may determine whether the ray being evaluated hits 904 the first primitive being evaluated. For example, if the ray being evaluated does not hit (e.g., NO at 904) the first primitive being evaluated, the miss shader 810 may be invoked, for example, to return a simple color. On the other hand, if the ray being evaluated hits (e.g., YES at 904) the first primitive being evaluated, an appropriate closest-hit shader 812 may be invoked to determine whether the first primitive is the closest geometric instance to the starting point of the ray. This process of acceleration structure traversal 902, intersection shader 806 execution, and any-hit shader 808 execution may continue for all of the rays until the primitive that is the closest-hit for each of the rays have been determined (or it is determined that the ray does not intersect any primitives).

Generally, the closest-hit shader 812 may be invoked for each ray, and the color may be evaluated at the point of intersection (between the ray and the primitive). This color may be used to appropriately perturb the original color at the pixel whose color is being evaluated. For example, in a comparative example, if the ray is a primary ray, then the color determined by the execution of the closest hit shader is used as the color of the pixel (e.g., on the display screen). According to an embodiment of the present disclosure, the rasterized information (e.g., the rasterized color information) for the pixel being evaluated may be used as an initial color, which may then be refined by secondary ray traversal, such that the color resulting from the secondary ray traversal may be used to perturb the initial rasterized color. For example, in some embodiments, any of the closest-hit shader 812, miss shader 810, or ray generation shader 804 may trigger shooting of secondary rays, which may be used to modify the initial rasterized color of the pixel being evaluated.

At the end of the execution, the ray generation shader 804 may return the final color for the pixel being evaluated. At the point where the application-supplied material shader is to be executed, this can be further modulated to select among a potentially simpler version of the shader when the object in question turns out to be in a low spatial-resolution region (e.g., as determined by the VRS data VRSDATA). Tempering the number of secondary rays traced and selection of a particular material shader version may be performed independently, or in a coordinated fashion as controlled by the application hints and application supplied shader codes.

FIG. 10 illustrates an example of a recursive ray-tracing method according to one or more embodiments of the present disclosure.

According to one or more embodiments, the ray tracer 316 may use a suitable recursive ray-tracing method to ray-trace the pixels identified in the RTM. For example, while the traversal control data 706 of the acceleration structure (BVH) may be used for limiting/reducing/tempering the number of secondary rays generated, this does not preclude support for generation of secondary rays from the miss shader 810 and the closest-hit shader 812.

Accordingly, in some embodiments, the ray tracer 316 may make recursive calls to the acceleration structure traversal 902, which may in turn call the miss shader 810 or the closest-hit shader 812. In some embodiments, the recursive calls may be shortened by running only portions of the closest-hit shader 812 (and miss shader 810) that may determine whether to create a secondary ray—without evaluating the color. For example, in some embodiments, the ray tracer 316 may generate a light-weight ray-bounce shader 816 from the closest-hit shader 812 and the miss shader 810 based on the material property of the pixel being evaluated to determine whether or not to create a secondary ray without evaluating the color. Extending this, a plurality of different versioned material shaders 814 (which may provide additional color/luminance/shading effects depending on the material properties of the object) may be provided (e.g., by the application) in which a given object has, potentially, more than one version of a material shader 814, and the version selection may be performed at run-time based on various suitable criteria, with the intent being to run a simpler version of a material shader 814 whenever possible without adversely affecting image quality. For example, the version of the material shader 814 selected may be based on the VRS data VRSDATA of the evaluated pixel.

In some embodiments, the ray-tracing method may vary depending on the VRS data VRSDATA. For example, if the VRS data VRSDATA is provided on a per-draw level basis, then it may be directly included in the state object associated with shader objects. Each of these objects may be linked to the leaf level nodes of the acceleration structure (BVH). This may be useful when ray-tracing only certain objects in the scene, or when shooting rays from only a subset of the given objects. When the VRS data VRSDATA is specified per screen region, this may be handled at the ray generation shader 804, for example, such that when executing the ray generation shader 804, secondary rays are spawned from an evaluated pixel at a rate tempered by the granularity (e.g., the shading rate) specified by VRS data VRSDATA. If the VRS data VRSDATA is specified at the primitive level, then the "adjustment" of spawned rays may be performed after the ray generation shader 804 so that a lesser number of the material shaders 814 are invoked.

In other words, the rays may be given an "importance" factor (e.g., the traversal control data 706) based on the VRS data VRSDATA, which indicates how many additional bounces may be considered. Thus, not only are the number of the initial rays-per-pixel reduced, but also the number of bounces may be changed/reduced, further reducing the overall ray-tracing calculations. Accordingly, the ray importance (e.g., the traversal control data 706) may be a factor used in determining a selection of a suitable version of a material shader 814.

Figure 11:
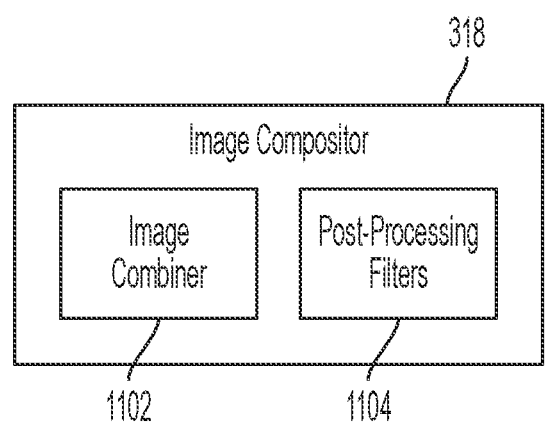
FIG. 11 illustrates a block diagram of an image compositor according to one or more embodiments of the present disclosure.

FIG. 11 illustrates a block diagram of an image compositor according to one or more embodiments of the present disclosure.

Referring to FIGS. 3 and 11, in some embodiments, the image compositor 318 may combine the rasterized portions (e.g., rasterized pixels) of the image generated by the rasterizer 312 with the ray-traced portions (e.g., the ray-traced pixels) of the image generated by the ray tracer 316 to generate the hybrid composite image, and may output the image data corresponding to the hybrid composite image defining the grayscale values for the pixels in the display device to suitably display the hybrid composite image. For example, in some embodiments, the image compositor 318 may include an image combiner 1102 and post-processing filters 1104.

The image combiner 1102 may composite (e.g., may combine) the rasterized portions with the ray-traced portions using any suitable method as would be understood by those having ordinary skill in the art. In some embodiments, because each of the ray-traced pixels may have been first rasterized, each of the ray-traced pixels may also include the rasterized pixel information (e.g., the rasterized color information). In this case, if another higher priority task is waiting for the GPU, the image combiner 1102 may select the rasterized pixel information as the pixel color instead of processing the ray-traced pixel information. The post-processing filters 1104 may apply any suitable post-processing functionality and/or effects to the hybrid composite image as would be understood by those having ordinary skill in the art. Accordingly, the image combiner 1102 may generate the hybrid composite image, and may generate and output the corresponding image data to the display device using any suitable method as would be understood by those having ordinary skill in the art.

Figure 12A:
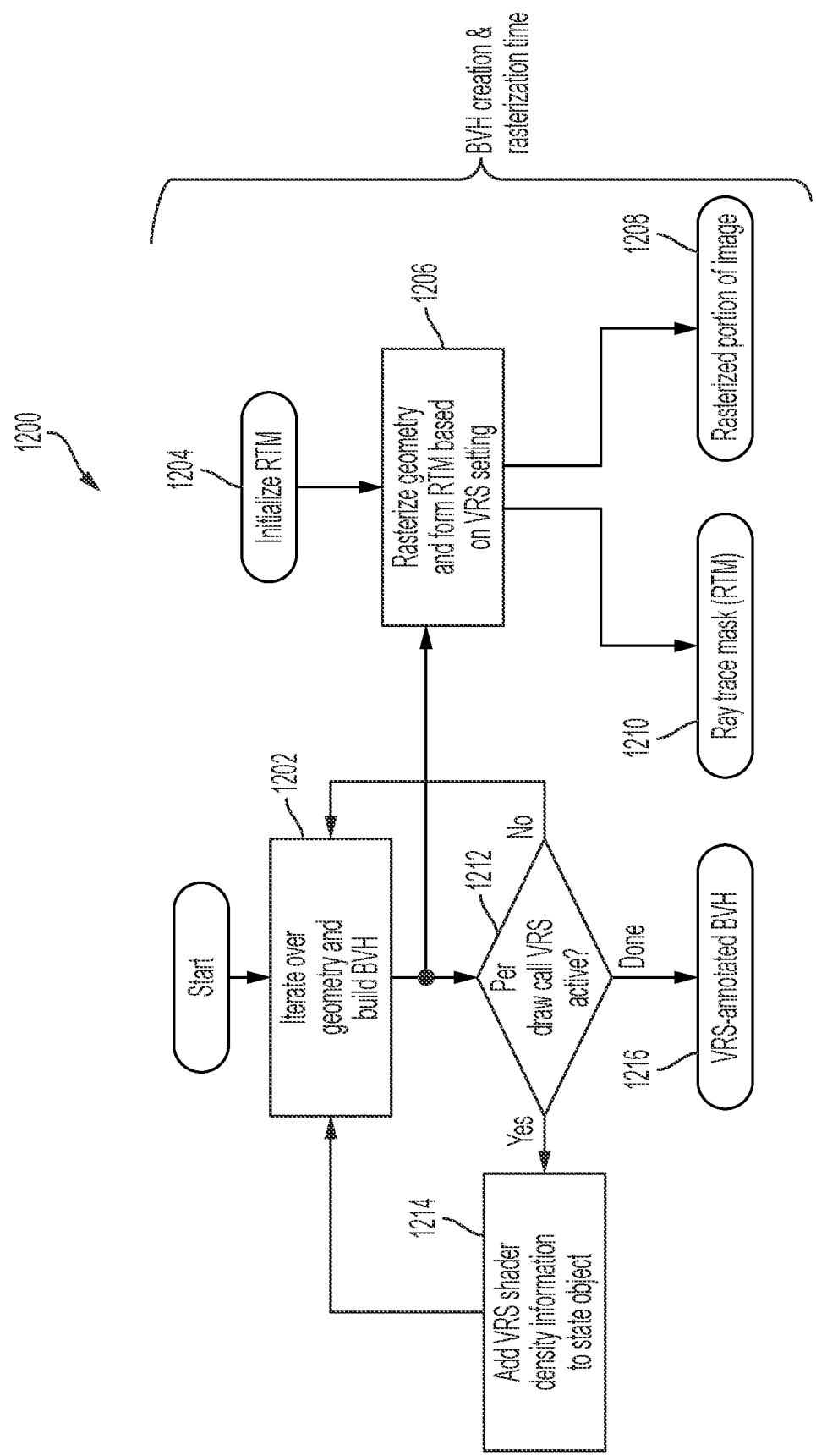
FIGS. 12A-12C illustrate a method of generating a hybrid composite image according to one or more embodiments of the present disclosure.
Figure 12B:
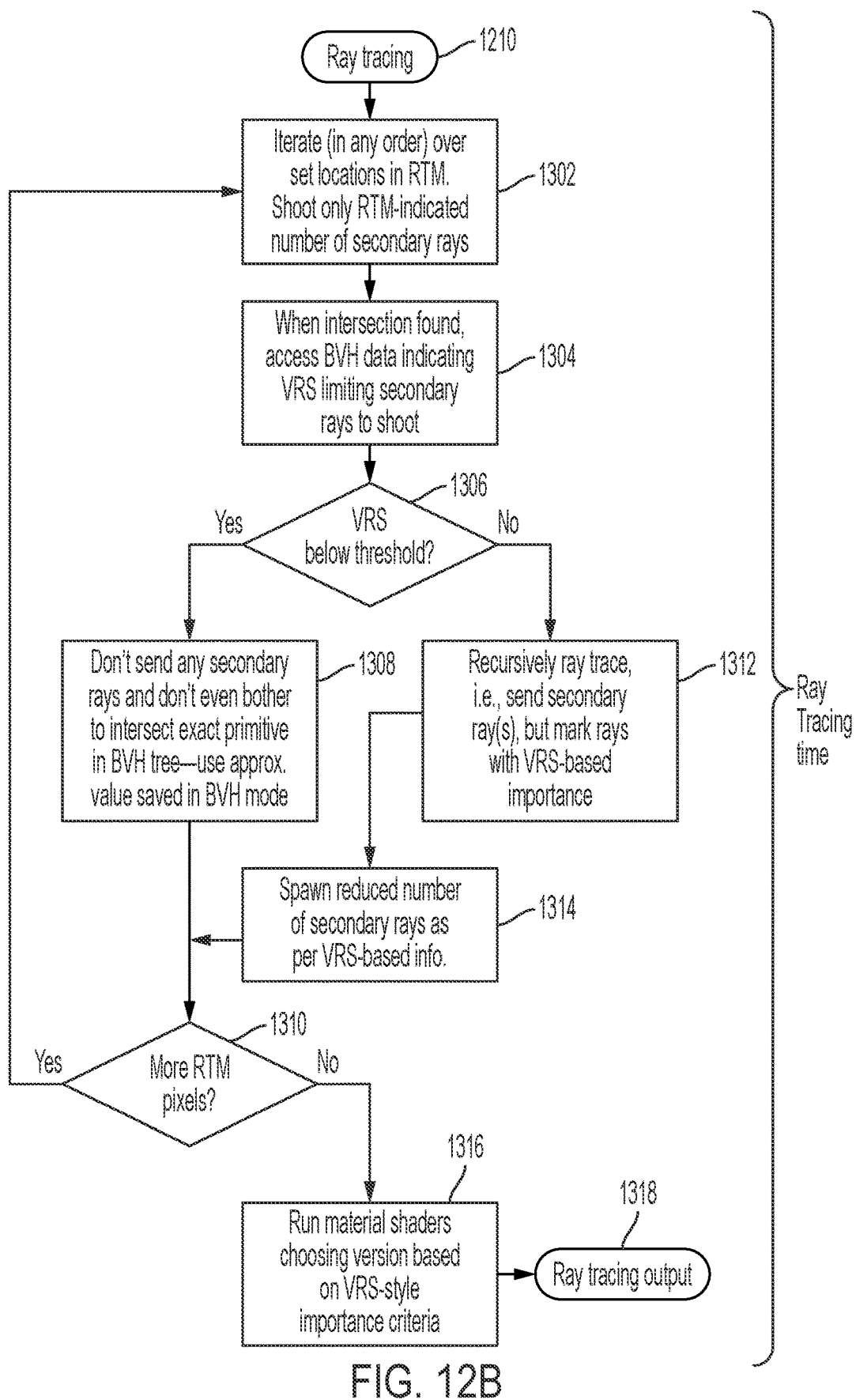
Figure 12C:
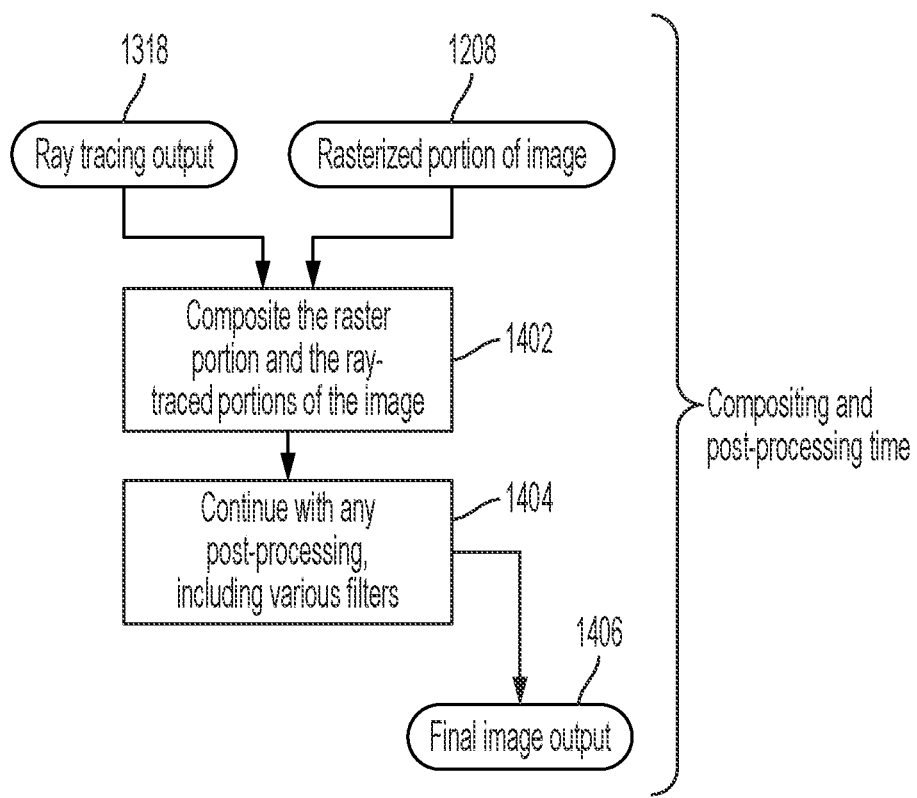

FIGS. 12A-12C illustrate a method 1200 of generating a hybrid composite image according to one or more embodiments of the present disclosure. However, the present disclosure is not limited to the sequence or number of the operations of the method 1200 shown in FIGS. 12A-12C, and can be altered into any desired sequence or number of operations as recognized by a person having ordinary skill in the art. For example, in some embodiments, the order may vary, or the method 1200 may include fewer or additional operations.

Referring to FIGS. 12A-12C, the method 1200 may include an acceleration structure generation and rasterization time as shown in FIG. 12A, a ray-tracing time as shown in FIG. 12B, and a compositing and post-processing time as shown in FIG. 12C. For example, the operations of the acceleration structure generation and rasterization time as shown in FIG. 12A may be performed by the rasterizer 312 and the acceleration structure (BVH) generator 314, the operations of the ray-tracing time as shown in FIG. 12B may be performed by the ray tracer 316, and the operations of the compositing and post-processing time as shown in FIG. 12C may be performed by the image compositor 318. However, the present disclosure is not limited thereto, and the operations shown in the method 1200 may be performed by any suitable one of the components and elements or any suitable combination of the components and elements of those of one or more example embodiments described above.

First, referring to FIG. 12A, the method 1200 may start, and the acceleration structure (BVH) may be generated according to the scene data SDATA, and at the same or substantially at the same time (e.g., concurrently or simultaneously), the scene data SDATA may be rasterized and the RTM may be generated. For example, the acceleration structure (BVH) generator 314 may iterate over the geometry contained in the scene data SDATA to generate the acceleration structure (BVH) at block 1202. Concurrently, the rasterizer 312 may initialize the RTM (e.g., the pixel RT count buffer 504) at block 1204, and may rasterize the geometry contained in the scene data SDATA and generate the RTM based on the VRS data VRSDATA (e.g., the VRS density settings) at block 1206. Accordingly, a rasterized portion of the image may be generated at block 1208, and the RTM may be generated at block 1210 as described above.

In some embodiments, for each geometry of the scene data SDATA iterated at block 1202, the acceleration structure (BVH) generator 314 may determine whether the shading rate (e.g., the VRS data) on the display screen for the evaluated geometry is per draw call at block 1212. If so (e.g., YES at block 1212), the acceleration structure generator 314 may add VRS shader density information (e.g., corresponding to the traversal control data 706) to the state object at block 1214, and the method 1200 may continue at block 1202 to evaluate another geometry of the scene data SDATA. Otherwise (e.g., NO at block 1212), the method 1200 may continue at block 1202 to evaluate another geometry of the scene data SDATA. Once all of the geometry of the scene data SDATA have been evaluated, the acceleration structure including the traversal control data 706 may be generated at block 1216.

Referring to FIG. 12B, the ray tracer 316 may use the RTM generated at block 1210 and the acceleration structure generated at block 1216 to ray-trace portions of the rasterized image identified in the RTM. For example, the ray tracer 316 may ray-trace (e.g., in any suitable order) over the set locations (e.g., the identified pixels) in the RTM, and may shoot only RTM-indicated number of secondary rays at block 1302. In other words, only the pixels identified in the RTM may be sent rays from a relevant view point (e.g., an eye-point or a view-point of a camera).

When an intersection is found, the ray tracer 316 may access the acceleration structure generated at block 1216, indicating the VRS limited secondary rays to shoot (e.g., by the traversal control data 706) at block 1304. The ray tracer 316 may determine if the VRS settings of the evaluated pixel is below one or more threshold shading rates at block 1306, and if so (e.g., YES at block 1306), the approximate value saved in a corresponding node of the acceleration structure (BVH) may be used at block 1308, and a determination of whether there are more pixels in the RMT to evaluate may be made at block 1310. In other words, instead of shooting secondary rays and ray/BVH intersection calculations, if the shading rate of the evaluated pixel is below one or more threshold shading rates (e.g., indicating a lower granularity of shading of the corresponding area on the display screen), then the value of the pixel saved in the corresponding node of the BVH (which may be based on the rasterized value of the pixel) may be used, and the method may continue to block 1302 to evaluate another pixel identified in the RTM.

On the other hand, if the VRS settings of the evaluated pixel is greater than or equal to one or more threshold shading rates at block 1306 (e.g., NO at block 1306), then the ray tracer 316 may recursively ray-trace (e.g., send secondary rays marked with VRS-based importance) at block 1312 using any suitable recursive ray-tracing method, for example, such as the recursive ray-tracing method described above with reference to FIG. 10. For example, the ray tracer 316 may use the traversal control data 706 of the acceleration structure (BVH) to determine the number of secondary rays to shoot for the pixels of an evaluated object, and whether each of the spawned secondary rays intersect an object located in an "important" area of the screen as determined by the VRS data VRSDATA of the object. The ray tracer 316 may spawn the reduced number of secondary rays according to the traversal control data 706 at block 1314, and a determination of whether there are more pixels in the RTM to evaluate may be made at block 1310.

If there are more pixels identified in the RTM for evaluation at block 1310 (e.g., YES at block 1310), then the method may continued to block 1302 to evaluate the additional pixels identified in the RTM. On the other hand, if not (e.g., NO at block 1310), then one or more material shaders may be selected based on the VRS data VRSDATA (e.g., VRS-style importance criteria) at block 1316, and the ray-traced portion (e.g., the ray-traced pixels) may be generated at block 1318 according to the RTM.

Referring to FIG. 12C, the image compositor 318 may combine the rasterized portions (e.g., rasterized pixels) of the image 1208 generated by the rasterizer 312 with the ray-traced portions (e.g., the ray-traced pixels) of the image 1318 generated by the ray tracer 316 to generate the hybrid composite image at block 1402. In some embodiments, the image compositor 318 may further post-process the hybrid composite image, for example, including various filters as would be understood by those having ordinary skill in the art, at block 1404, such that a final image including portions that are ray-traced and portions that are rasterized may be generated. The final image may be output (e.g., as image data) at block 1406, for example, to a display device, and the method 1200 may end.

According to one or more embodiments of the present disclosure, an RTM may be generated during a rasterization pass, and during a ray-tracing pass, the rasterized pixels identified in the RTM may be further ray-traced to add improved ray-tracing effects to only those rasterized pixels identified in the RTM. In some embodiments, the shading rate for the pixels identified for ray-tracing enhancement may be used to reduce the number of rays generated and processed during ray-tracing. Accordingly, in one or more embodiments of the present disclosure, improved hybrid ray-tracing systems and methods may be provided in which processing power may be reduced and/or a rendering time may be reduced.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A hybrid ray tracing system, comprising:
a processor; and
memory comprising instructions that, when executed by the processor, cause the processor to:
identify a subset of pixels of an image to be ray-traced based on variable rate shading (VRS) screenspace image data;
set, based on the VRS screenspace image data, one or more material properties of at least one object corresponding to the subset of pixels;
determine, based on the VRS screenspace image data, a surviving coverage of the at least one object in a screenspace associated with the subset of pixels; and
perform ray-tracing for the subset of pixels to generate a ray-traced image,
wherein the ray-tracing comprises performing a ray casting process based on the set one or more material properties by modulating a number of ray bounces corresponding to the set one or more material properties based on the surviving coverage defined by the VRS screenspace image data.

2. The system of claim 1, wherein the one or more material properties of the at least one object includes a shader attached to the at least one object, and the shader is selected based on the VRS screenspace image data.

3. The system of claim 2, wherein a relatively more computationally complex shader is selected when the VRS screenspace image data indicates that the subset of pixels is of relatively higher importance, or a relatively less computationally complex shader is selected when the VRS screenspace image data indicates that the subset of pixels is of relatively lower importance.

4. The system of claim 1, wherein a relatively lower reflectivity is set when the VRS screenspace image data indicates that the subset of pixels is of relatively lower importance.

5. The system of claim 1, wherein the one or more material properties of the at least one object correspond to a number of bounces a ray would perform when it interacted with the object.

6. The system of claim 1, wherein a relatively higher maximum number of bounces is set when the VRS screenspace image data indicates that the subset of pixels is of relatively higher importance, or a relatively lower maximum number of bounces is set when the VRS screenspace image data indicates that the subset of pixels is of relatively lower importance.

7. A hybrid ray tracing method, comprising:
identifying a subset of pixels of an image to be ray-traced based on variable rate shading (VRS) screenspace image data;
setting, based on the VRS screenspace image data, one or more material properties of at least one object corresponding to the subset of pixels;
determining, based on the VRS screenspace image data, a surviving coverage of the at least one object in a screenspace associated with the subset of pixels; and
performing ray-tracing for the subset of pixels to generate a ray-traced image,
wherein the ray-tracing comprises performing a ray casting process based on the set one or more material properties by modulating a number of ray bounces corresponding to the set one or more material properties based on the surviving coverage defined by the VRS screenspace image data.

8. The method of claim 7, wherein the one or more material properties of the at least one object includes a shader attached to the at least one object, and the shader is selected based on the VRS screenspace image data.

9. The method of claim 8, wherein a relatively more computationally complex shader is selected when the VRS screenspace image data indicates that the subset of pixels is of relatively higher importance, or a relatively less computationally complex shader is selected when the VRS screenspace image data indicates that the subset of pixels is of relatively lower importance.

10. The method of claim 7, further comprising setting a relatively lower reflectivity when the VRS screenspace image data indicates that the subset of pixels is of relatively lower importance.

11. The method of claim 7, wherein the one or more material properties of the at least one object correspond to a number of bounces a ray would perform when it interacted with the object.

12. The method of claim 7, further comprising setting a relatively higher maximum number of bounces when the VRS screenspace image data indicates that the subset of pixels is of relatively higher importance, or setting a relatively lower maximum number of bounces when the VRS screenspace image data indicates that the subset of pixels is of relatively lower importance.

13. One or more non-transitory computer readable media containing program instructions that, when executed by one or more processors, cause the one or more processors to perform operations comprising:
identifying a subset of pixels of an image to be ray-traced based on variable rate shading (VRS) screenspace image data;
setting, based on the VRS screenspace image data, one or more material properties of at least one object corresponding to the subset of pixels;
determining, based on the VRS screenspace image data, a surviving coverage of the at least one object in a screenspace associated with the subset of pixels; and
performing ray-tracing for the subset of pixels to generate a ray-traced image,
wherein to perform the ray-tracing, the instructions cause the one or more processors to perform a ray casting process based on the set one or more material properties by modulating a number of ray bounces corresponding to the set one or more material properties based on the surviving coverage defined by the VRS screenspace image data.

14. The non-transitory computer readable media of claim 13, wherein the one or more material properties of the at least one object includes a shader attached to the at least one object, and the instructions cause the one or more processors to select the shader based on the VRS screenspace image data.

15. The non-transitory computer readable media of claim 14, wherein the instructions cause the one or more processors to select a relatively more computationally complex shader when the VRS screenspace image data indicates that the subset of pixels is of relatively higher importance, or select a relatively less computationally complex shader when the VRS screenspace image data indicates that the subset of pixels is of relatively lower importance.

16. The non-transitory computer readable media of claim 13, wherein the instructions cause the one or more processors to set a relatively lower reflectivity when the VRS screenspace image data indicates that the subset of pixels is of relatively lower importance.

17. The non-transitory computer readable media of claim 13, wherein the one or more material properties of the at least one object correspond to a number of bounces a ray would perform when it interacted with the object.

18. The non-transitory computer readable media of claim 13, wherein the instructions cause the one or more processors to set a relatively higher maximum number of bounces when the VRS screenspace image data indicates that the subset of pixels is of relatively higher importance, or set a relatively lower maximum number of bounces when the VRS screenspace image data indicates that the subset of pixels is of relatively lower importance.

* * * * *